(12) United States Patent
Tayama

(10) Patent No.: US 10,246,013 B2
(45) Date of Patent: Apr. 2, 2019

(54) AUTOMOBILE PROXIMITY WARNING SYSTEM

(71) Applicants: Shuichi Tayama, Tokyo (JP); IMAGE CO., LTD., Tokyo (JP)

(72) Inventor: Shuichi Tayama, Tokyo (JP)

(73) Assignees: Shuichi TAYAMA, Tokyo (JP); IMAGE CO., LTD., Tokyo (JP)

( * ) Notice: Subject to any disclaimer, the term of this patent is extended or adjusted under 35 U.S.C. 154(b) by 0 days.

(21) Appl. No.: 15/745,924

(22) PCT Filed: Jul. 4, 2016

(86) PCT No.: PCT/JP2016/069804
§ 371 (c)(1),
(2) Date: Jan. 18, 2018

(87) PCT Pub. No.: WO2017/014035
PCT Pub. Date: Jan. 26, 2017

(65) Prior Publication Data
US 2018/0208112 A1    Jul. 26, 2018

(30) Foreign Application Priority Data
Jul. 22, 2015 (JP) ................................. 2015-144591

(51) Int. Cl.
*B60Q 1/00* (2006.01)
*B60Q 5/00* (2006.01)
*G08G 1/16* (2006.01)

(52) U.S. Cl.
CPC ............... *B60Q 5/006* (2013.01); *B60Q 5/00* (2013.01); *G08G 1/16* (2013.01)

(58) Field of Classification Search
CPC ............. B60Q 5/006; B60Q 5/00; G08G 1/16
See application file for complete search history.

(56) References Cited

U.S. PATENT DOCUMENTS 5,635,903 A * 6/1997 Koike ................... A63H 17/34
 17/34
2002/0167589 A1* 11/2002 Schofield ............... B60N 2/002
 348/148

(Continued)

FOREIGN PATENT DOCUMENTS

JP     H07-209424 A    8/1995
JP     2011-162055 A    8/2011

(Continued)

OTHER PUBLICATIONS

PCT/ISA/210, "International Search Report for International Application No. PCT/JP2016/069804" dated Sep. 20, 2016.

*Primary Examiner* — Quang Pham
(74) *Attorney, Agent, or Firm* — Manabu Kanesaka

(57) ABSTRACT

Provided is an automobile proximity warning system that notifies a detection object such as a pedestrian of automobile proximity while ensuring quiet for surrounding environment. A plurality of parametric speakers (13, 14, 15) are arranged so as to emit sound outside a vehicle from different positions of a vehicle body of an own vehicle. When a detection object existing around the own vehicle is detected by a sensor device, a distance detecting unit (5c) detects the direction and distance to the detection object, with the own vehicle being as a reference, from detection information from the sensor device. A warning control unit (5d) selects any of the speakers (13, 14, 15) for emitting sound in the direction and controls warning sound to be emitted while adjusting breadth of the directivity of the speaker in accordance with the distance.

5 Claims, 6 Drawing Sheets

(56) References Cited

U.S. PATENT DOCUMENTS

| | | | | |
|---|---|---|---|---|
| 2007/0050114 A1* | 3/2007 | Koike | ............... | B60W 30/08 701/45 |
| 2008/0204556 A1* | 8/2008 | de Miranda | ......... | B60R 25/102 348/148 |
| 2009/0243823 A1* | 10/2009 | Takahashi | ......... | G06K 9/00805 340/435 |
| 2010/0090863 A1* | 4/2010 | Chen | ................ | G01S 13/931 340/901 |
| 2012/0057757 A1* | 3/2012 | Oyama | ............. | G06K 9/00798 382/104 |
| 2012/0194328 A1* | 8/2012 | Nakayama | ............ | B60Q 5/008 340/425.5 |
| 2012/0316734 A1 | 12/2012 | Takagi | | |
| 2013/0088578 A1* | 4/2013 | Umezawa | .............. | G08G 1/166 348/47 |
| 2013/0154852 A1* | 6/2013 | Kim | ..................... | B60Q 5/008 340/904 |
| 2015/0070158 A1* | 3/2015 | Hayasaka | ................ | G01S 7/04 340/438 |
| 2015/0070194 A1* | 3/2015 | Jo | .......................... | G08G 1/163 340/905 |
| 2015/0191117 A1* | 7/2015 | Arita | ..................... | B60Q 5/008 340/435 |
| 2015/0264538 A1* | 9/2015 | Klang | .................. | H04W 4/023 455/457 |
| 2015/0288943 A1* | 10/2015 | Kuranuki | .................. | G01S 5/16 348/47 |
| 2016/0240085 A1* | 8/2016 | Otsuka | .............. | G06K 9/00805 |
| 2016/0264047 A1* | 9/2016 | Patel | .................... | B60Q 9/008 |

FOREIGN PATENT DOCUMENTS

| | | |
|---|---|---|
| JP | 2011-168130 A | 9/2011 |
| JP | 2011-201368 A | 10/2011 |
| WO | 2011/121791 A1 | 10/2011 |
| WO | 2014/038009 A1 | 3/2014 |

* cited by examiner

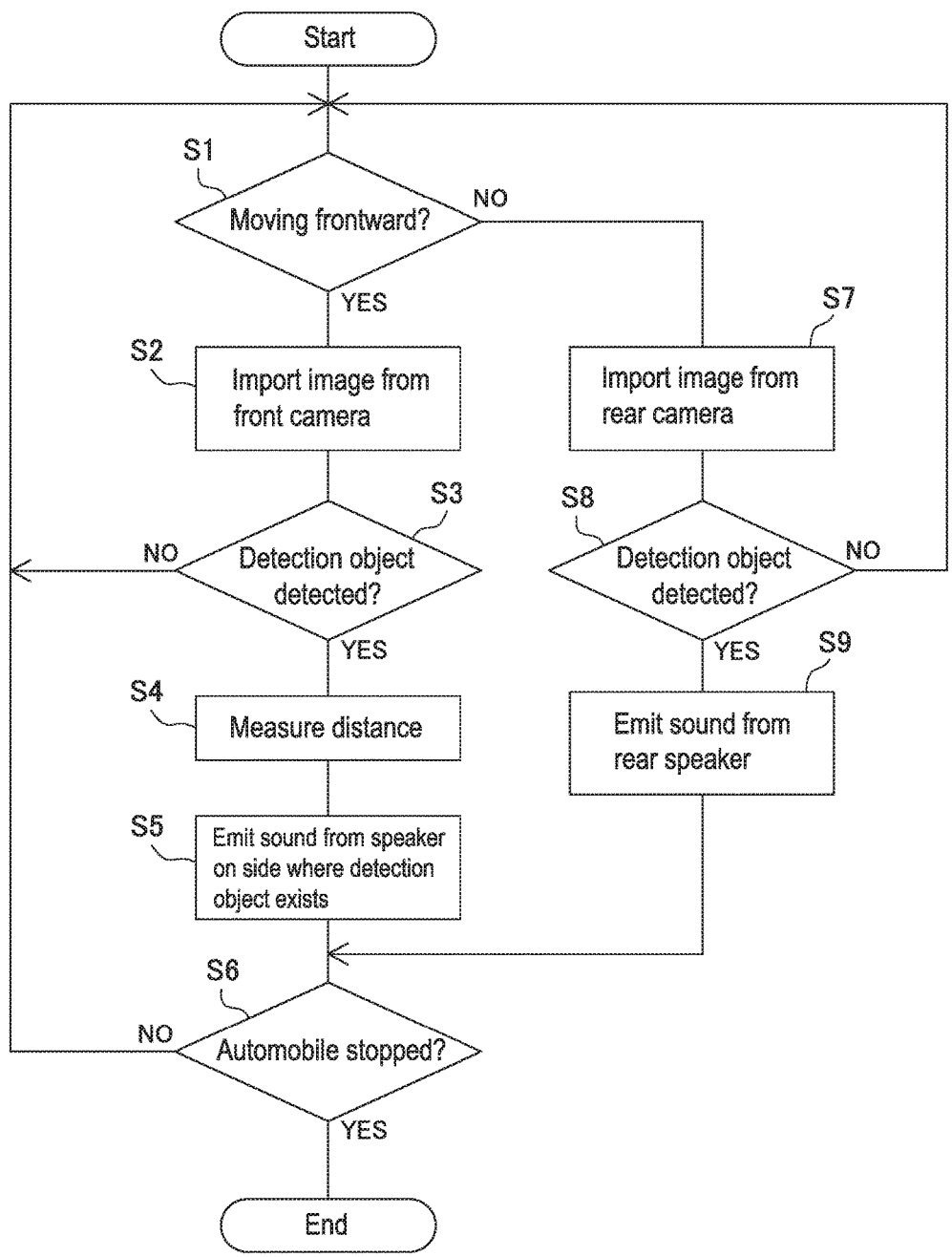

AUTOMOBILE PROXIMITY WARNING SYSTEM

RELATED APPLICATIONS

The present application is National Phase of International Application No. PCT/JP2016/069804 filed Jul. 4, 2016, and claims priority from Japanese Application No. 2015-144591, filed Jul. 22, 2015, the disclosure of which is hereby incorporated by reference herein in its entirety.

TECHNICAL FIELD

The present invention relates to an automobile proximity warning system, and in particular, relates to an automobile proximity warning system that notifies a pedestrian or the like therearound of existence of an own vehicle as being mounted on a low-noise automobile such as a hybrid vehicle, an electric vehicle, and a fuel cell vehicle.

BACKGROUND ART

Since a low-noise automobile such as a hybrid vehicle, an electric vehicle, and a fuel cell vehicle is driven by electric motors, travelling sound thereof is smaller than that of an automobile driven only by an internal combustion engine with petroleum oil. Accordingly, a risk increases to cause an accident due to unexpected rushing-out of a pedestrian therearound as being not aware of proximity of an automobile.

To solve such a problem, there has been known an electric vehicle that notifies a pedestrian existing at the front in a travelling direction of proximity of an automobile by operating a speaker with a detection output of a detector when the pedestrian is detected by the detector (e.g., see Patent Literature 1).

There has been also known a proximity warning sound emitting device that emits proximity warning sound in accordance with a direction of a detected pedestrian with speakers arranged on the right and left of each of the front and rear of an automobile (e.g., see Patent Literature 2).

CITED LITERATURE

Patent Literature

Patent Literature 1: Japanese Patent Application Laid-Open No. 7-209424
Patent Literature 2: Japanese Patent Application Laid-Open No. 2011-201368

SUMMARY OF THE INVENTION

It is greatly useful that a low-noise automobile notifies a pedestrian and the like of proximity of an own vehicle. However, intentional sound emitting causes conflict as losing an advantage of quiet of the low-noise automobile.

In view of the above, the present invention provides an automobile proximity warning system that notifies a detection object such as a pedestrian of proximity of an automobile while ensuring quiet for surrounding environment.

An automobile proximity warning system of the present invention includes a sensor device configured to detect a detection object existing around an own vehicle; a plurality of parametric speakers arranged to emit sound outside the own vehicle from different positions of a vehicle body of the own vehicle; a distance detecting unit configured to detect a direction and a distance to the detection object, with the own vehicle being as a reference, from detection information from the sensor device; and a warning control unit configured, when the detection object is detected, to select any of the speakers located in the detected direction and controls warning sound to be emitted while adjusting breadth of directivity of the speaker in accordance with the distance.

Here, the warning control unit controls sound emitting so that, in accordance with the distance, a frequency and volume of the warning sound is varied, and when the warning sound is intermittent sound, an interval is varied. In this case, proximity degree of an automobile can be recognized in an audible manner with variation of tone of the warning sound.

When the sensor device is configured of a stereo camera being a pair of cameras, the distance detecting unit can detect the distance to the detection object with use of a parallax image generated from images taken by both the cameras.

When the sensor device is configured of a radar sensor, the distance detecting unit can detect the distance with use of a reflection wave toward the radar sensor with respect to an emission wave toward the detection object emitted by the radar sensor.

Here, the sensor device may be a communication device configured to receive positional information of the detection object through communication. In this case, the distance detecting unit can detect the distance from the positional information transmitted by the detection object.

According to the automobile proximity warning system of the present invention, when a detection object around an automobile is detected, warning sound is emitted from a parametric speaker with a narrow directivity, the emitting direction of which corresponds to the detection object. Accordingly, the warning sound is not diffused therearound and is prevented from being a noise to the extent possible.

Further, since breadth of directivity angle is set adjustable in accordance with a distance to the detection object, the warning sound can be reliably provided by widening the directivity when the distance to the detection object becomes short.

BRIEF DESCRIPTION OF THE DRAWINGS

FIG. 3 is a flowchart illustrating operation of the automobile proximity warning system of the present invention.

EMBODIMENTS OF THE INVENTION

In the following, embodiments of an automobile proximity warning system of the present invention will be described with reference to drawings.

Figure 1:
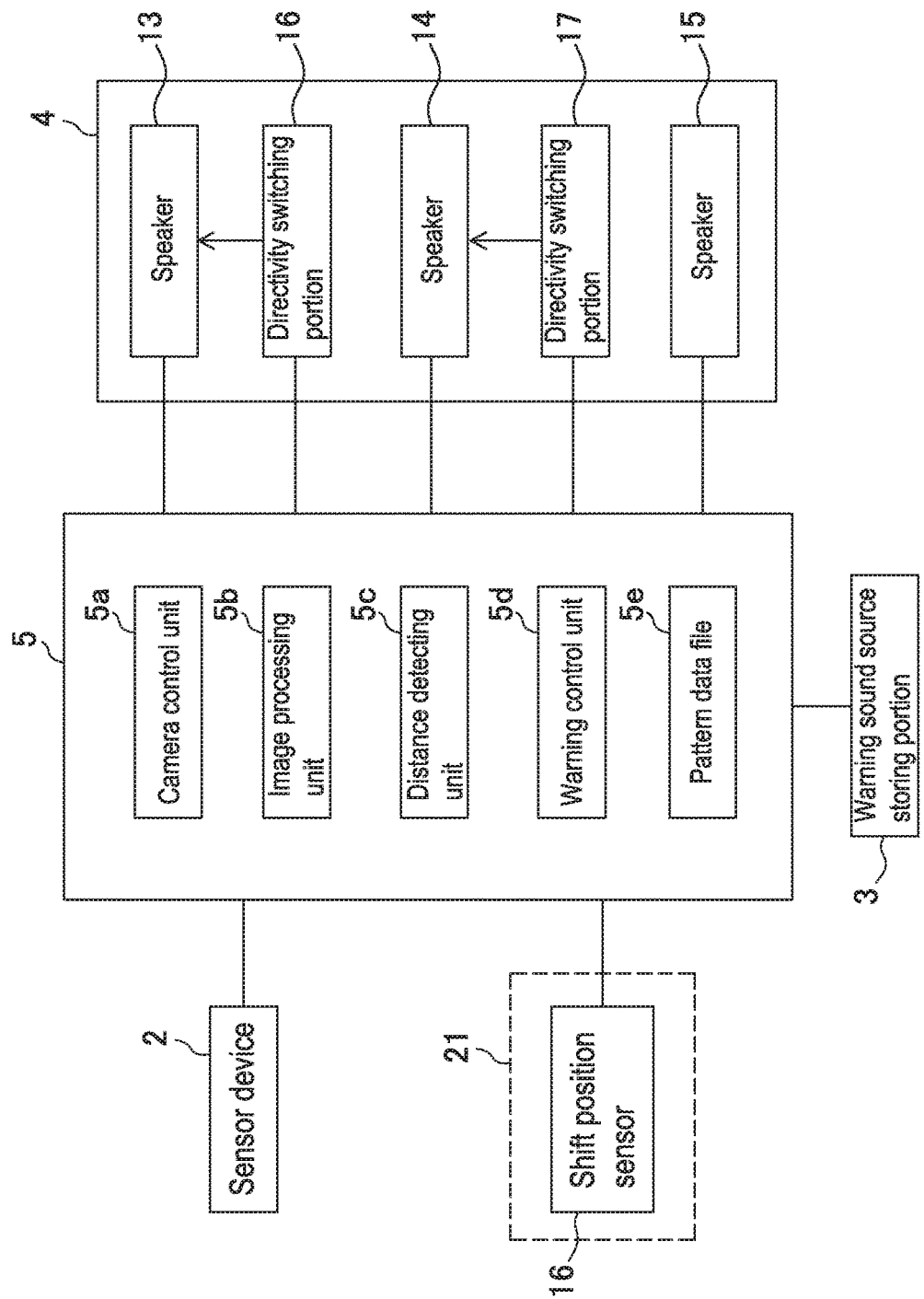
FIG. 1 is a block diagram illustrating an entire configuration of an automobile proximity warning system of a preferable embodiment of the present invention.

FIG. 1 schematically illustrates an entire configuration of an automobile proximity warning system 1. The automobile proximity warning system 1 includes a sensor device 2, a warning sound source storing portion 3, a warning sound emitting device 4, and a control unit 5.

The sensor device 2 detects situation around the own vehicle. In the present embodiment, as illustrated in FIG. 2, the sensor device 2 includes a stereo camera 9 being a pair of front cameras 6, 7 arranged at a front windshield 11 for detecting front-view in the travelling direction of the automobile 10, and a rear camera 8 arranged at a rear windshield 12 for detecting rear-view of an automobile 10.

Owing to widening view angles of the front cameras 6, 7, a detection object such as a pedestrian, a bicycle, a motorcycle, or the like existing on a lateral front side of the automobile 10 is sterically detected.

The warning sound source storing portion 3 is a memory unit that stores warning sound source signals corresponding to audible sound. A variety of sound source may be used for the warning sound source signals. Artificial engine sound is preferable from a viewpoint of easiness for a person to recognize existence of an automobile. It is also effective to adopt voice prepared by voice synthesis or recording to directly provide information of existence of an automobile 10 with words.

Figure 2:
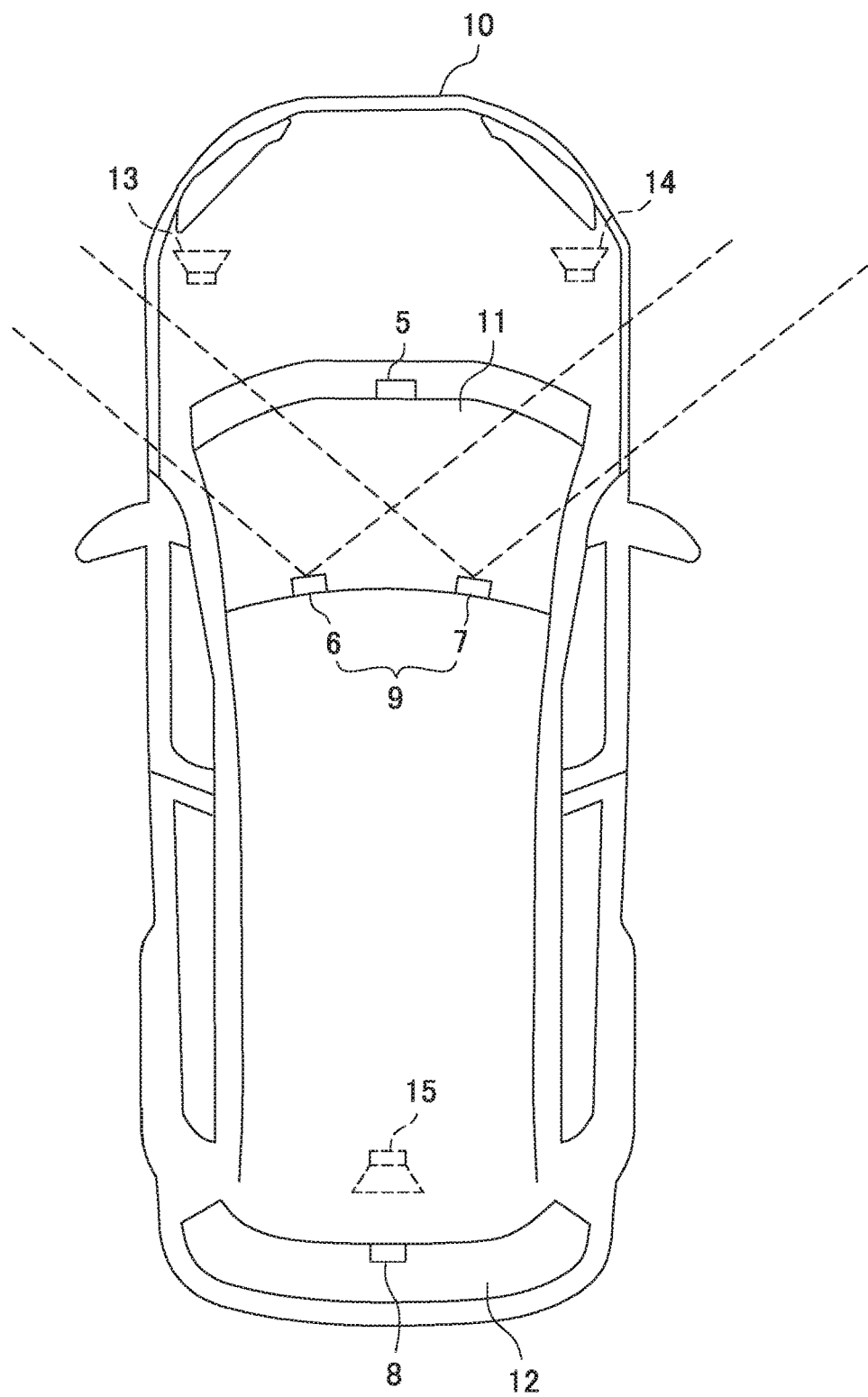
FIG. 2 is a plane view illustrating an example of arrangement of cameras being a sensor device and speakers.

As illustrated in FIG. 2, the warning sound emitting device 4 includes parametric speakers 13, 14, 15 that emit warning sound outside the automobile 10 with a narrow directivity as being assembled in a vehicle body at the right and left of the front and at the center of the rear of the automobile 10. Such a parametric speaker includes an ultrasonic oscillator that transduces electric signals into ultrasonic waves and radiates the ultrasonic waves, and causes the ultrasonic oscillator to emit ultrasonic waves amplitude-modulated in accordance with the warning sound source signal of the warning sound source storing portion 3. Accordingly, the radiated ultrasonic waves turn into audible sound through a non-linear phenomenon of sound waves while being propagated through air. A directivity angle of a normal speaker is about 150 degrees. On the other hand, such a parametric speaker has a narrow directivity, the angle of which is in a range between 30 degrees and 60 degrees.

The warning sound emitting device 4 includes directivity switching portions 16, 17 that adjust breadth of directivity angles of the respective speakers 13, 14 in a range approximately between 30 degrees and 60 degrees. A variety of methods are known to be adopted for the directivity switching portions 16, 17 to adjust the angles of the directivity of the speakers 13, 14. Examples thereof include a method to widen a range through which ultrasonic waves are propagated by arranging a plurality of auxiliary ultrasonic oscillators, a method to commonly use a parametric speaker with a wide ultrasonic directivity and a parametric speaker with a narrow directivity, and a method to vary a mechanical structure of a parametric speaker to cause diffusion of ultrasonic waves. On the other hand, in the present embodiment, a directivity angle of the speaker 15 at the rear is fixed to 60 degrees.

The control unit 5 is configured of a computer including a CPU, a ROM, and a RAM. A camera control unit 5a, an image processing unit 5b, a distance detecting unit 5c, and a warning control unit 5d are actualized by the CPU executing a control program stored in the ROM. The control unit 5 is electrically connected to a driving system 21 of the automobile 10, and for example, a signal is input thereto from a shift position sensor 16.

The camera control unit 5a controls operation of the cameras 6, 7, 8 based on the signal from the shift position sensor 16. That is, the camera control unit 5a causes the cameras 6, 7 to operate when the shift position of the automobile 10 is for frontward moving and causes the camera 8 to operate when the shift position thereof is for rearward moving.

The image processing unit 5b performs a pattern matching process on images transmitted from the respective cameras 6, 7, 8, and recognizes an outline of a detection object such as a pedestrian, a bicycle, a motorcycle, and the like in the images so as to determine existence of the detection object. Here, the ROM stores a pattern data file 5e in which image features of detection objects are previously registered.

The distance detecting unit 5c detects the same detection object through a front-left image taken by the camera 6 and a front-right image taken by the camera 7 and measures a distance to the detection object as generating a parallax image.

When the detection object is detected, the warning control unit 5d selects a speaker that is arranged to emit sound toward the detected direction and outputs, to the speaker, a warning sound source signal stored in the warning sound source storing portion 3. Accordingly, owing to that the speaker emits ultrasonic waves obtained by amplitude-modulating the warning sound source signal, warning sound with a narrow directivity reaches the detection object. At that time, when the speaker 13, 14 is caused to emit the warning sound, the warning control unit 5d adjusts breadth of directivity in accordance with the distance measured by the distance detecting unit 5c by controlling the corresponding directivity switching portion 16, 17.

Further, when the warning sound source signal is output to any of the speakers 13, 14, 15, the warning control unit 5d varies sound quality of the warning sound in accordance with the distance to the detection object measured by the distance detecting unit 5c. Here, for varying the sound quality with frequencies, the warning sound is emitted at a low pitch with a low frequency when the detection object is at a distance and goes up to a high pitch with a heightened frequency as the distance is becoming short, so that feeling of proximity to the detection object is provided. Alternatively, it is also possible that warning sound is emitted at a high pitch with a high frequency when the detection object is at a distance and goes down to a low pitch with a lowered frequency as the distance is becoming short. In short, feeling of proximity of the automobile 10 is provided by variation of high-low of warning sound.

For varying sound quality with sound volume, the sound volume is set small when the detection object is at a distance and is enlarged as the distance is becoming short. Here, it is also possible to concurrently vary the frequency and volume of the warning sound as the distance to the detection object is becoming short.

Not limited to continuous sound, the warning sound may be emitted intermittently. In this case, a detection object can be caused to sense a danger by shortening the interval as the distance to the detection object is becoming short.

FIG. 3 is a flowchart illustrating control operation of the control unit 5. Operation of the automobile proximity warning system having the abovementioned configuration will be described based on FIG. 3.

First, the camera control unit 5a of the control unit 5 determines whether the automobile 10 is moving frontward or rearward based on a signal generated when the shift position sensor 16 detects variation of the shift position (step S1). When the automobile 10 is moving frontward, the camera control unit 5a activates the front cameras 6, 7 and imports image data from both the cameras 6, 7 (step S2).

Then, the image processing unit 5b of the control unit 5 recognizes an outline of a detection object by performing the pattern matching process on images taken respectively by the front cameras 6, 7 as referring to a pattern data file 5e and determines whether or not the detection object is detected (step S3).

Figure 4A:
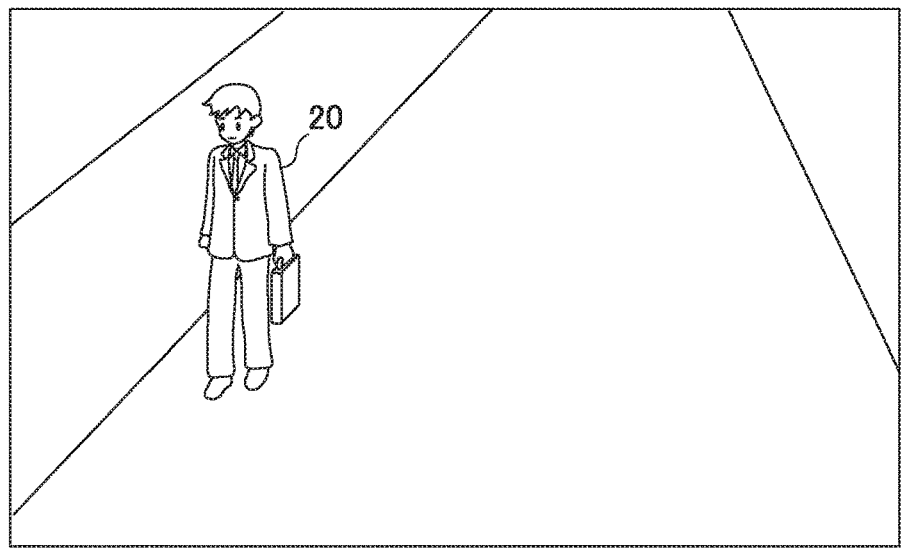
FIGS. 4A and 4B are schematic views illustrating images taken respectively by right-left cameras.
Figure 4B:
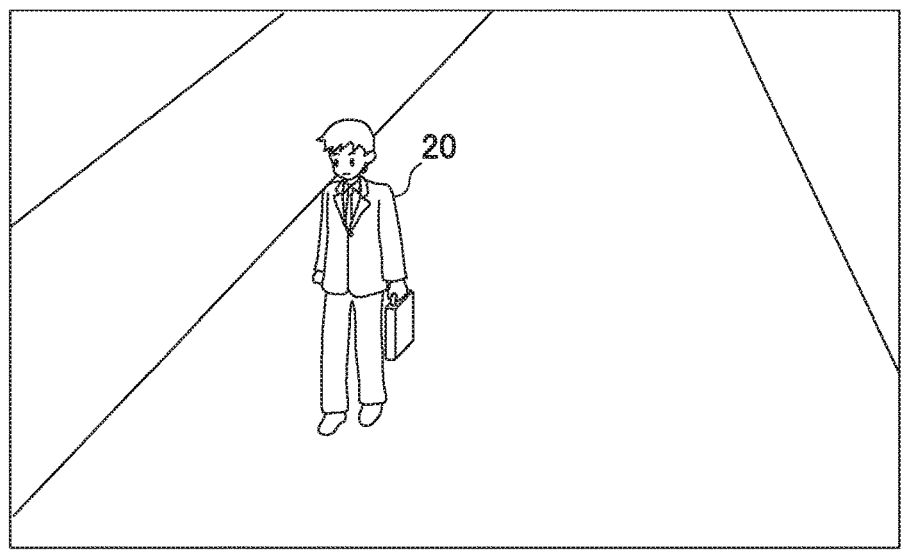

In this case, it is assumed that a pedestrian 20 at the front-left is commonly captured, as the detection object, respectively in a left image as illustrated in FIG. 4A taken by the camera 6 and a right image as illustrated in FIG. 4B taken by the camera 7. Then, the distance detecting unit 5c of the control unit 5 generates a parallax image by superimposing the two images with the position of the pedestrian 20 fixed, and then, measures a distance to the pedestrian 20 through calculation with use of the parallax image (step S4).

Figure 5:
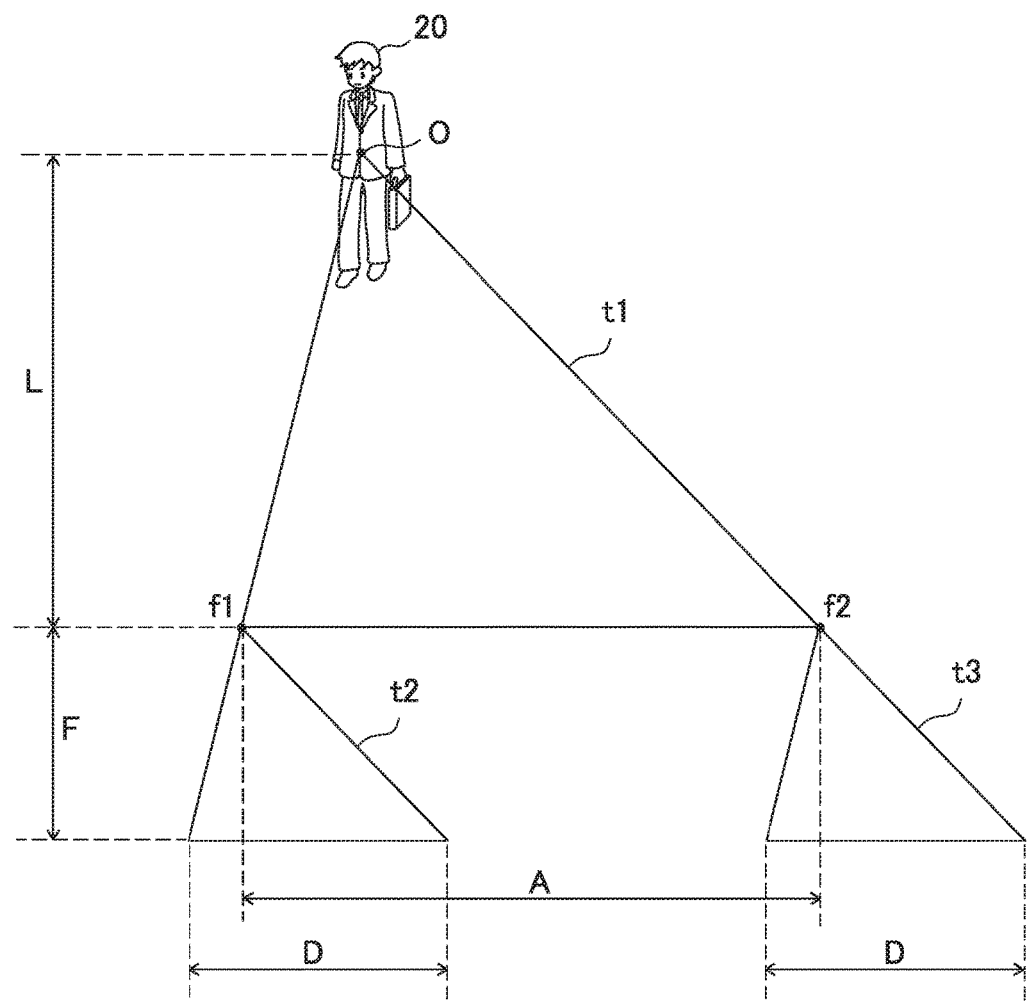
FIG. 5 is a schematic view illustrating a relation between distances to a detection object respectively from the right-left cameras in a parallax image.

FIG. 5 is a schematic view illustrating a relation between distances to the pedestrian 20 respectively from both the cameras 6, 7 in the parallax image. In FIG. 5, a triangle t1 with three vertexes being focal positions f1, f2 of the cameras 6, 7 and a position O of the pedestrian 20 is similar to a triangle t2 with three vertexes being both ends of a parallax D and the focal position f1 of the camera 6. Here, a relational expression of "L/F=A/D" is satisfied when L represents the height of the triangle t1 (i.e., the distance to the pedestrian 20), F represents the height of the triangle t2 (i.e., the focal length of the camera), and A represents the distance between the cameras 6, 7. The parallax D can be acquired from the number of pixels of the image data and the distance L to the pedestrian 20 can be calculated on the basis of the above.

After the distance L to the pedestrian 20 is measured, the warning control unit 5d of the control unit 5 selects the speaker 13 because the pedestrian 20 exists on the left side in front of the automobile 10 and controls the directivity switching portion 4A so that warning sound is emitted with a directivity angle that corresponds to the distance L to the pedestrian 20 (step S5). In addition, the warning control unit 5d controls the speaker 13 to emit warning sound with a frequency and volume corresponding to the distance L, and in the case that warning sound is intermittent sound, to emit the warning sound with an interval corresponding to the distance L.

For example, when the distance L to the pedestrian 20 is 20 meters or shorter, the warning control unit 5d controls the directivity switching portion 16, 17 so that the directivity angle of the speaker 13 becomes to 30 degrees. When the distance L becomes to 10 meters, the warning control unit 5d controls the directivity switching portion 16, 17 so that the directivity angle becomes to 60 degrees. Thus, when the automobile 10 becomes close to the pedestrian 20, the directivity is widened so that the warning sound is reliably recognized. At the same time, the warning control unit 5d can call more attention by heightening the frequency and/or increasing the volume of the warning sound. Thus, since the directivity angle of the warning sound to be transmitted is narrow when the pedestrian 20 is at a distance, it is possible to suppress diffusion of the warning sound over a wide range.

The camera control unit 5a of the control unit 5 determines whether the automobile 10 is stopped on the basis of that the shift position is at neutral or parking based on a signal from the shift position sensor 16 (step S6). During non-stopping of the automobile 10, the control unit 5 repeats the processes from step S1. Then, when the distance L to the pedestrian 20 is detected through the image data from the image processing unit 5b to be 20 meters or shorter, the warning control unit 5d controls the warning sound to be emitted so that the directivity angle thereof is 30 degrees. When the distance L becomes less than 10 meters with further proximity, the warning control unit 5d controls the warning sound to be emitted so that directivity angle thereof is switched to 60 degrees.

On the other hand, when it is determined that the automobile 10 is moving rearward ("NO" in step S1), the camera control unit 5a activates the rear camera 8 and imports image data at the rear (step S7). Subsequently, the image processing unit 5b recognizes an outline of a detection object by performing the pattern matching process on an image taken by the rear camera 8 as referring to the pattern data file 5e and determines existence of the detection object (step S8). When the image processing unit 5b cannot recognize existence of the detection object, the control unit 5 performs the processes starting from step S1.

When the detection object exists at the rear, the warning control unit 5d controls the speaker 15 to emit warning sound (step S9). Then, when it is determined that the automobile 10 is stopped owing to that the shift position is at neutral or parking based on the signal from the shift position sensor 16 ("YES" in step S6), the camera control unit 5a stops operation of the camera 6, 7, 8 and control with the control unit 5 is ended.

In the case that the automobile 10 is moving rearward, it is for parking or being put into a garage in most cases. Therefore, it is simply required that existence of a detection object is recognizable. In the present embodiment, the rear camera 8 is arranged alone and a distance to a detection object is not to be measured. Accordingly, a directivity angle of the speaker is fixed to about 60 degrees. However, it is also possible that breadth of the directivity angle is set adjustable in accordance with a distance L to the detection object with rear cameras arranged at the right and left.

In the above, description is provided on a warning system of a low-noise automobile 10 according to the embodiment of the present invention. Here, not limited to cameras, the sensor device 2 may be a radar sensor. Such a radar sensor may be configured of a millimeter-wave radar, a micro-wave radar, a laser radar, an infrared radiation sensor, an ultrasonic sensor, or the like. When a millimeter-wave radar is adopted instead of the cameras 6, 7, 8 in the configuration of FIG. 1, the millimeter-wave radar emits a beam wave in a range between 30 GHz and 300 GHz, receives a reflection wave reflected due to collision of the beam wave with an object, and performs outputting to the distance detecting unit 5c. The distance detecting unit 5c measures a distance L to the object based on temporal deviation between the beam wave and the reflection wave. Then, the warning control unit 5d controls warning sound to be emitted, from a speaker corresponding to a position of the millimeter-wave radar that receives the reflection wave, with a directivity angle that corresponds to the distance L.

Recently, research and development of automated driving systems have been in progress for further improving safety of road traffic. With such an automated driving system, an automobile automatically travels while recognizing circumstances therearound. In Japan, automation degree of automated driving systems for vehicles such as automobiles is defined as being classified into four levels, from Level 1 to Level 4. Level 1 is called a safe driving assisting system with which any of accelerating, steering, and braking is performed by an automobile. Level 2 is called a quasi-automated-driving system with which a plurality of operations among accelerating, steering, and braking is performed by an automobile. Level 3 is also called a quasi-automated-driving system with which all of accelerating, steering, and braking are performed by an automobile while those are performed by a driver only in a case of emergency. Level 4 is called a completely automated driving system with which all of accelerating, steering, and braking are performed something other than a driver completely without involvement of the driver. Here, an automated driving system represents Level 2 through Level 4 ("strategic innovation program (SIP) automated driving system research and development plan", Nov. 13, 2014, Cabinet Office, Director-General for Policy Planning, Science Technology and Innovation Department). Here, the term of automated driving is defined basically to include automated driving at all automation degrees, Level 1 to Level 4.

Such an automated driving vehicle is provided with the cameras 6, 7, 8 illustrated in FIG. 2 and/or a radar sensor for recognizing surrounding environment. For such an automated driving vehicle with low-noise, safety of road traffic can be further improved by utilizing the cameras and/or the radar sensor for automated driving as the sensor device 2.

In another embodiment of the present invention, it is possible to emit warning sound toward a detection object such as a pedestrian while obtaining information of a position of the detection object and a variety of other information through communication between an automobile and a communication device that is carried by the detection object.

Figure 6:
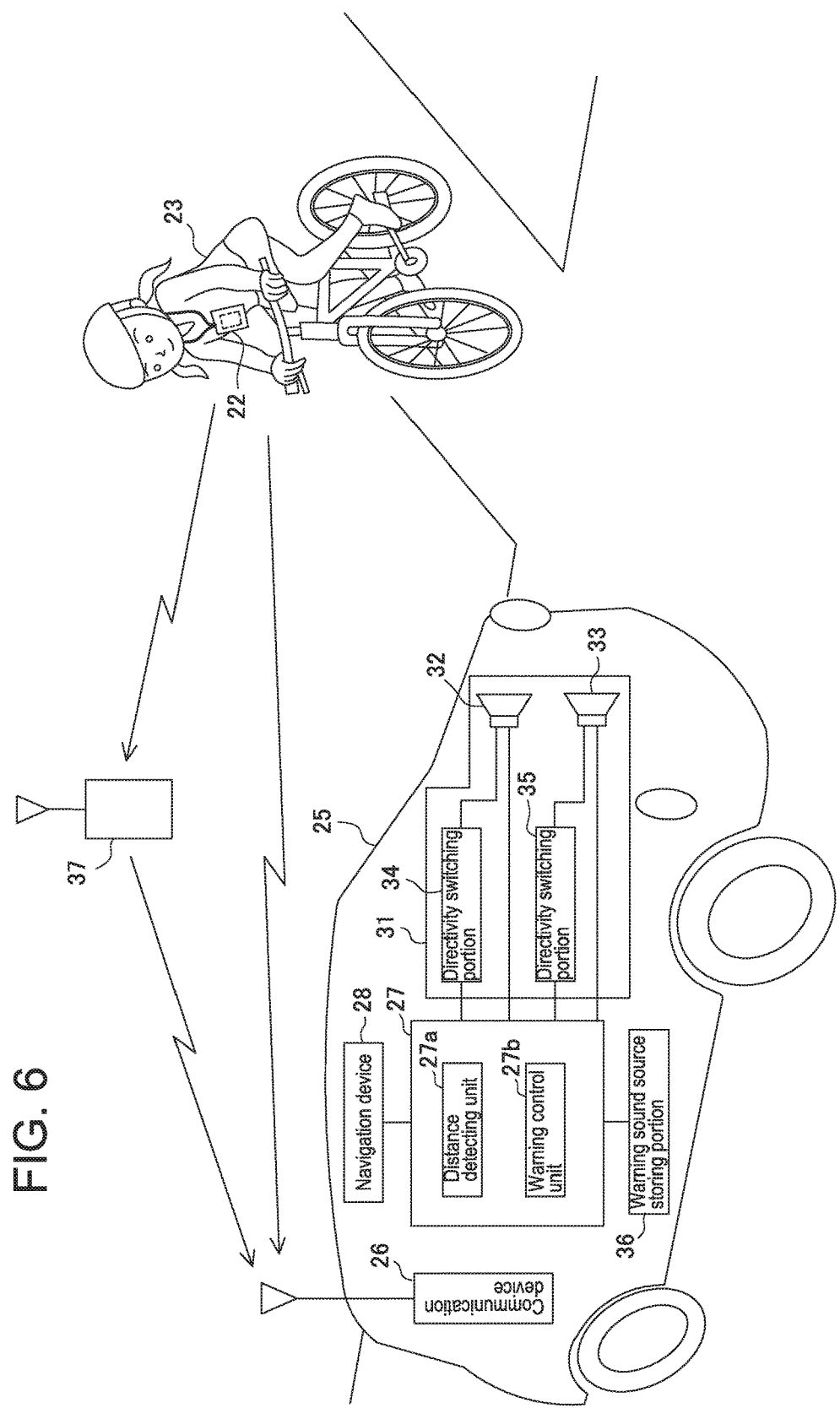
FIG. 6 is a schematic view of an automobile proximity warning system of another embodiment.

FIG. 6 schematically illustrates an automobile proximity warning system that emits warning sound toward a detection object detected through communication. In FIG. 6, a communication chip and a GPS module are assembled into a communication card 22 that is carried by a rider 23 of a bicycle and communication is performed between the communication card 22 and a communication device 26 mounted on an automobile 25. In this embodiment, the communication device 26 serves as a sensor device that detects a detection object existing around an own vehicle. In this case, there are two methods for communication between the communication device 26 and the communication card 22, one thereof being performed directly and the other being performed through an antenna 37 installed on a road.

The communication card 22 transmits, through communication with the communication device 26, positional information obtained by the GPS module. In the present embodiment, a control unit 27 includes a distance detecting unit 27a that measures a distance therebetween by referring to the transmitted positional information and positional information detected by a navigation system 28 mounted on the automobile 25, and a warning control unit 27b that controls warning sound to be emitted from a speaker while adjusting breadth of directivity in accordance with the measured distance.

Further, a warning sound emitting device 31 includes a pair of parametric speakers 32, 33 arranged at the right and left of the front of a vehicle body, a parametric speaker (not illustrated) arranged at the center of the rear thereof, and directivity switching portions 34, 35 that adjust breadth of directivity of the speakers 32, 33.

In the above configuration, after the control unit 27 obtains positional information of the communication card 22 carried by a person 23 through communication between the communication device 26 and the communication card 22, the distance detecting unit 27a measures the distance therebetween by referring to the transmitted positional information and the positional information detected by the navigation system 28 mounted on the automobile 25.

In the illustrated example, the communication device 26 detects the communication card 22 on the left side in the travelling direction of the automobile 25. When the distance detecting unit 27a detects that the distance to the bicycle rider 23 becomes to a first predetermined distance, the warning control unit 27b controls warning sound to be emitted with a warning sound source signal in a warning sound source storing portion 36 while controlling the directivity switching portion 23 so that the directivity angle of the speaker 32 becomes to 30 degrees. Further, when the distance detecting unit 27a detects that the distance to the bicycle rider 23 becomes to a second predetermined distance, the warning control unit 27b controls warning sound to be emitted with a warning sound source signal in the warning sound source storing portion 36 while controlling the directivity switching portion 34 so that the directivity angle of the speaker 32 becomes to 30 degrees.

In the above, description is provided in detail on preferable embodiments of the present invention. Here, not limited thereto, the present invention may be actualized with a variety of modifications within the technical scope thereof.

EXPLANATION OF REFERENCES

1 Automobile proximity warning system
2 Sensor device
5c Distance detecting unit
5d Warning control unit
6, 7 Camera (Stereo camera)
8 Camera
13, 14, 15 Parametric speaker
26 Communication device
27a Distance detecting unit
27b Warning control unit
32, 33 Parametric speaker

The invention claimed is:
1. An automobile proximity warning system comprising:
   a stereo camera including a pair of cameras for capturing images of a front of an own vehicle;
   a plurality of parametric speakers arranged to emit warning sound outside the own vehicle from different front horizontal positions of a vehicle body of the own vehicle;
   a control unit prerecorded with image features of detection objects to be detected by the stereo camera:
   an image processing unit for performing a pattern matching process to recognize an image feature of a detection object from the image features of the detection objects based on images from the pair of cameras to determine an existence of the detection object:
   a distance detecting unit detecting a direction and a distance to the detection object, with the own vehicle being as a reference, from parallaxes of the images from the pair of cameras; and
   a warning control unit, when the image processing unit detects the existence of the detection object, selecting a speaker of the plurality of parametric speakers located in the same direction in which the detection object was detected and to control the warning sound to be emitted while adjusting breadth of directivity in accordance with the distance to the detection object,
   wherein the warning control unit performs adjusting to widen an angle of the directivity of the selected speaker as the distance to the detection object decreases.
2. The automobile proximity warning system according to claim 1, wherein the warning control unit controls sound emitting so that, in accordance with the distance to the detection object, a frequency and volume of the warning sound is varied, and when the warning sound is intermittent sound, an interval is varied.

3. The automobile proximity warning system according to claim 1, wherein the warning control unit increases a pitch of the warning sound as the distance to the detection object decreases.

4. The automobile proximity warning system according to claim 1, further comprising
a camera control unit for operating the pair of cameras when a position of a shift position sensor of the own vehicle is at a forward moving position and taking the images from the pair of cameras.

5. The automobile proximity warning system according to claim 1, wherein the plurality of parametric speakers includes a first speaker disposed at a front left side of the vehicle body and a second speaker disposed at a front right side of the vehicle body.

* * * * *